United States Patent
Kirschner

(10) Patent No.: US 6,464,422 B1
(45) Date of Patent: Oct. 15, 2002

(54) SEISMIC ADAPTER APPARATUS AND METHOD

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 09/846,678

(22) Filed: Apr. 30, 2001

(51) Int. Cl.$^7$ .............................. F16B 5/04; E02D 17/00
(52) U.S. Cl. .......................... 403/24; 248/235; 405/288
(58) Field of Search ........................ 403/24, 231, 232.1, 403/403, 382, 205, 285, 230; 52/633, 702, 712; 248/200, 58, 228.1, 59, 228.6, 235, 500; 405/288, 259

(56) References Cited

U.S. PATENT DOCUMENTS

| | | |
|---|---|---|
| RE14,044 E | 1/1916 | Griffin |
| 1,489,474 A | 4/1924 | Beckwith |
| 1,678,506 A | 7/1928 | Guillet |
| 1,929,835 A | 10/1933 | Awbrey ........................ 72/105 |
| 2,396,174 A | 3/1946 | Hawes .......................... 25/131 |
| 2,814,058 A | 11/1957 | Hickson ........................... 9/42 |
| 3,245,649 A | 4/1966 | Cassidy et al. ............. 248/361 |
| 3,472,475 A | 10/1969 | Rudiger ....................... 248/228 |
| 3,626,648 A | 12/1971 | Beckham ..................... 52/127 |
| 3,806,074 A | 4/1974 | Ward .......................... 248/228 |
| 3,981,469 A | 9/1976 | Torbet et al. ................ 248/235 |
| 3,993,279 A | 11/1976 | Holt ............................ 248/235 |
| 4,601,616 A | 7/1986 | Barish et al. ................ 405/288 |
| 4,679,967 A | 7/1987 | Hipkins, Sr. et al. ....... 405/288 |
| 4,699,547 A | 10/1987 | Seegmiller ................... 405/288 |
| 4,846,433 A | 7/1989 | Courtois et al. ............. 248/235 |
| 4,960,348 A | 10/1990 | Seegmiller ................... 405/259 |
| 5,160,211 A | 11/1992 | Gilb ............................ 403/231 |
| 5,755,535 A | 5/1998 | Fox .............................. 405/288 |
| 5,897,088 A | 4/1999 | Kirschner .................... 248/300 |
| 5,947,424 A | 9/1999 | Heath ............................ 248/58 |
| 5,947,431 A | 9/1999 | Kiggins ....................... 248/200 |
| 6,061,989 A | 5/2000 | Trivedi et al. ................. 52/633 |
| 6,082,560 A | 7/2000 | Timm ...................... 211/90.01 |

OTHER PUBLICATIONS

AFCON Flyer 560 Side Beam Bracket and 565 Side Beam Bracket 6 Hole (1 page).

Primary Examiner—Robert E. Pezzuto
(74) Attorney, Agent, or Firm—Lyon & Lyon LLP

(57) ABSTRACT

A seismic adapter for attachment to a steel web joist including two beams with the upper beam having laterally extending flanges with a wood nailer positioned thereon includes two brackets. Each bracket is a plate formed to define a base section, a mounting section and an engagement section. The mounting section is adjacent and perpendicular to the base section while the engagement is also adjacent to the base section and extends at an obtuse angle therefrom. A passage extends through the wood nailer with a shaft extending therethrough to rigidly retain the mounting sections against the wood nailer. The passage has a center distance above the undersurface of the laterally extending flanges which is greater than the distance from the axis of the holes of the mounting sections to the edges of the engagement sections.

6 Claims, 1 Drawing Sheet

US 6,464,422 B1

SEISMIC ADAPTER APPARATUS AND METHOD

BACKGROUND OF THE INVENTION

The field of the present invention is building construction hardware for mounting components such as utilities to steel web joists.

Building construction frequently uses steel web joists. Such devices employ two beams. The beams are mutually parallel and spaced apart to create a large moment of inertia for the joist. Cord elements extend at angles between the two so the beams will act as one in bending. Each beam includes a set of two elongate angle elements which are also mutually parallel. The cord elements extend for anchoring to between the elongate angle elements which form a cord space to receive the elements. Each angle element includes two legs extending at a right angle to one another, a first leg which is parallel with the first leg of the other angle element to define the cord space and a second leg extending in opposite directions from the second leg of the other angle element to generally define laterally extending flanges lying in a plane. Above the angle element of the upper beam, a wood nailer may be employed. The wood nailer sits on the plane defined by the laterally extending flanges and is typically approximately the same width as the beam defined by the two flanges.

Right angle brackets having holes centrally extending through each of the two legs of the bracket are well known. Such brackets are used in both wood and steel construction. However, steel construction often requires the hanging of various construction components such as pipes from the basic steel structure. The steel structure in such construction typically is not conveniently or economically modified through drilling, welding or the like to provide attachment for such components. Consequently, it is advantageous to provide clamping mechanisms, which can, without modifying the beam, rigidly support a mounting for the beam. Such clamping mechanisms frequently are adjustable to accommodate the variations in such beams and avoid the need for stocking excessive parts. An adjustable clamping mechanism providing a mounting is illustrated in U.S. patent application Ser. No. 09/389,771, filed Sep. 2, 1999, for Hanger For Mounting Two I-Beams, the disclosure of which is incorporated herein by reference.

SUMMARY OF THE INVENTION

The present invention is directed to a seismic adapter for attachment to the beam of a steel web joist including a wood nailer and a method of mounting of such an adapter.

In a first separate aspect of the present invention, a seismic adapter includes two brackets positionable to either side of the wood nailer and retained by a shaft extending through the wood nailer. The brackets each include a mounting section to receive the shaft, a base section to extend beneath the beam of the steel web joist and an engagement section to engage the underside of the laterally extending flange of the steel web joist.

In a second separate aspect of the present invention, a seismic mounting includes two brackets positionable to either side of the wood nailer and retained by a shaft extending through the wood nailer. The brackets each include a mounting section with a hole to receive the shaft, a base section to extend beneath the beam of the steel web joist and an engagement section to engage the underside of the laterally extending flange of the steel web joist. The shaft extends through a passage in the wood nailer at a center distance above the undersurface of the laterally extending flanges that is greater than the distance from the axis of the holes located on the mounting section of each bracket to the edges of the engagement sections of each bracket.

In a third separate aspect of the present invention, a method of seismic attachment employs the placement of brackets to either side of the wood nailer such that base sections extend inwardly beneath the laterally extending flanges and engagement sections rise to meet the underside of the flanges. A passage extends transversely through the wood nailer and a shaft through the passageway provides for drawing the mounting sections against the wood nailer. The passage is drilled such that the center distance above the undersurface of the laterally extending flanges of the steel web joist is greater than the distance from the axis of the holes through the mounting section to the edges of the engagement sections. In this way, the edges of the engagement sections are drawn hard against the underside of the laterally extending flanges of the steel web joist beam.

In a fourth separate aspect of the present invention, the foregoing separate aspects are contemplated to be employed in combination.

Accordingly, it is an object of the present invention to provide an improved seismic adapter and a method of seismic attachment to a steel web joist. Other and further objects and advantages will appear hereinafter.

DETAILED DESCRIPTION OF THE PREFERRED EMBODIMENT

Figure 1:
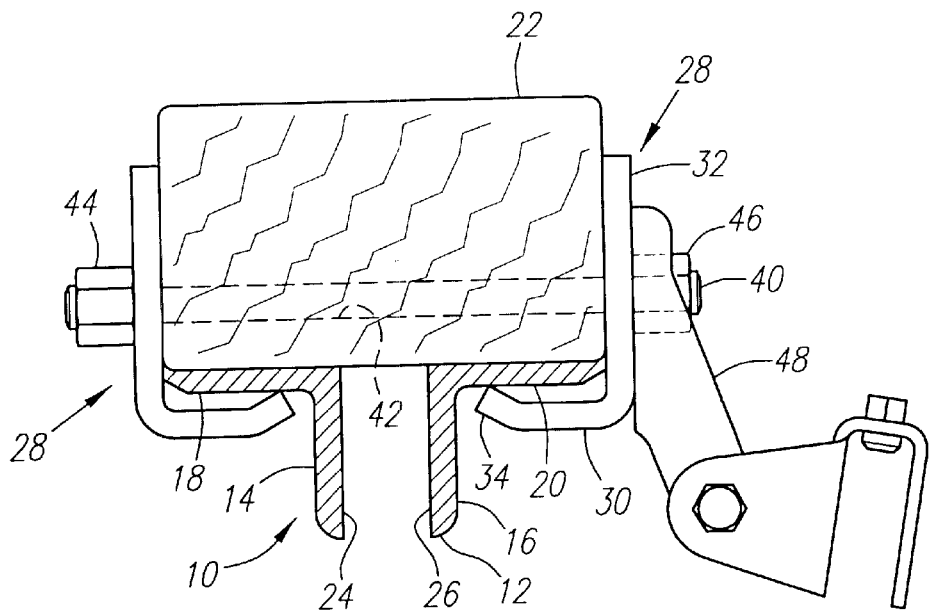
FIG. 1 is a cross-sectional view of a steel web joist employing a seismic adapter.

Turning in detail to the figures, the context of application of the seismic adapter is illustrated in FIG. 1 where a partial view of a steel web joist, generally designated 10 is illustrated. The steel web joist includes an upper beam 12 defined by two angle members 14 and 16 which are spaced apart to receive cord elements (not shown). The angle members 14 and 16 are arranged such that one leg of each defines a laterally extending flange 18 and 20 lying within a plane. A wood nailer 22 is positioned atop the laterally extending flanges 18 and 20 and is shown to be substantially the width thereof. The gap between depending legs 24 and 26 of the angle members 14 and 16 accommodate the cord elements.

Figure 2:
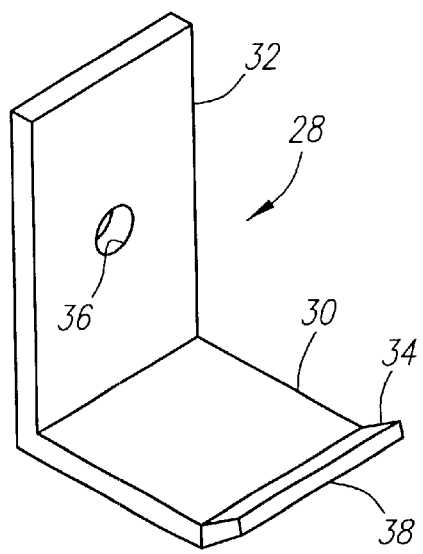
FIG. 2 is a perspective view of one bracket of the seismic adapter of FIG. 1.

The seismic adapter shown as an attachment to the steel web joist 10 in FIG. 1 includes two identical brackets, generally designated 28. One of the brackets 28 is illustrated by itself in FIG. 2. Each bracket 28 is a plate formed to define a base section 30, a mounting section 32 and an engagement section 34. The mounting section 32 is adjacent and perpendicular to the base section 30 and has a central hole 36 extending therethrough. The engagement section 34 is also adjacent to the base section 30 and extends at an obtuse angle from the base section to an edge 38 directed back toward the beam of the steel web joist 10. The base sections 30 and engagement sections 34 extend toward one another beneath the laterally extending flanges 18 and 20 as can be seen in FIG. 1.

A shaft 40 is extendible through a passage 42 arranged transversely through the wood nailer 22. The shaft 40 also extends through the holes 36 in the mounting sections 32.

Nuts 44 and 46 are shown threaded onto the threaded ends of the shaft 40. The nuts 44 and 46 define flanges for engaging the mounting sections about the holes 36 and, because of the threads, are forcibly movable along the shaft. The nut 46 also captures a hanger 48. Of course, the shaft 40 may employ a bolt to define one of the flanges while one of the nuts 44 and 46 would define the other.

In operation, the passage 42 is drilled transversely through the wood nailer 22. The brackets 28 are then positioned to either side of the wood nailer with the mounting sections 32 in juxtaposition with the sides of the wood nailer 22. The holes 36 are aligned with the passage 42 and the shaft is placed through the holes 36 and the passage 42. One nut 44 may have been prepositioned on the shaft 40 or the shaft 40 may be a bolt with a head. The hanger 48 is positioned and the nut 46 is threaded into place. The mounting sections 32 are drawn against the wood nailer 22 by forcefully moving the nut 46 having the flange thereon along the shaft until the shaft 40 is in tension and the wood nailer 22 is in compression between the mounting sections 32.

In arranging the several components, it is advantageous to drill the passage 42 through the wood nailer 22 at such a position that the tightening of the mounting sections 32 against the wood nailer 22 will bring the edges 38 of the engagement sections 34 into tight contact with the undersurface of the laterally extending flanges 18 and 20. To accomplish this, the passage 42 is preferably arranged such that the centerline of the passage 42 above the undersurface of the laterally extending flanges, defined as a center distance above that undersurface, is greater than the distance from the axis of the holes 36 to the edges 38 of the engagement sections 34. In this description, "distance" is meant to be the mathematical distance. In this sense, the axis of each hole 36 is understood to extend perpendicularly to the mounting section 32 and the measurement to the edge 38 is taken perpendicularly to the axis of the hole 36 in its projection. With such an arrangement, the mounting sections 32 might acquire a slight angle to the wood nailer 22 until forced together by the shaft 40, at which time the edges 38 will be rotated into the underside of the laterally extending flanges 18 and 20.

Thus, an improved seismic adapter and method of seismic attachment have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A seismic adapter for attachment to a steel web joist including an upper beam having laterally extending flanges and a wood nailer above the laterally extending flanges, comprising two brackets, each bracket includes a plate formed to define a base section, a mounting section adjacent and perpendicular to the base section and with a hole therethrough and an engagement section adjacent and extending at an obtuse angle from the base section;

a shaft extendable through the wood nailer and the holes in the mounting sections and including flanges at either end to engage the mounting sections about the holes, at least one of the flanges being forcefully movable along the shaft, the base sections and the engagement sections extending toward one another, respectively, and below the extending flanges with the mounting sections to either side of the wood nailer.

2. The seismic adapter of claim 1, the shaft being threaded at least at one end and at least one of a the flanges including a nut threaded onto the shaft.

3. A seismic mounting comprising a steel web joist including an upper beam having laterally extending flanges and a wood nailer above the laterally extending flanges;

two brackets, each bracket includes a plate formed to define a base section, a mounting section adjacent and perpendicular to the base section and with a hole therethrough and an engagement section adjacent and extending at an obtuse angle from the base section;

a shaft extendable through the wood nailer and the holes in the mounting sections and including flanges at either end to engage the mounting sections about the holes, at least one of the flanges being forcefully-movable along the shaft, the base sections and the engagement sections extending toward one another, respectively, and below the extending flanges with the mounting sections to either side of the wood nailer, the wood nailer including a passage transversely through the wood nailer at a center distance above the undersurface of. the laterally extending flanges that is greater than the distance from the axis of the holes to the edges of the engagement sections.

4. The seismic mounting of claim 3, the shaft being threaded at least at one end and at least one of a the flanges including a nut threaded onto the shaft.

5. A method of seismic attachment to a steel web joist including an upper beam having laterally extending flanges and a wood nailer above the laterally extending flanges, comprising placing a bracket to either side of the wood nailer, each bracket including a plate formed to define a base section, a mounting section adjacent and perpendicular to the base section and with a hole therethrough and an engagement section adjacent and extending at an obtuse angle from the base section to an edge, with the mounting sections to either side of the wood nailer and the base sections and the engagement sections extending toward one another, respectively, and below the extending flanges;

drilling a passage transversely through the wood nailer at a center distance above the undersurface of the laterally extending flanges that is greater than the distance from the axis of the holes to the edges of the engagement sections;

drawing the mounting sections against the wood nailer through the holes.

6. The method of claim 5, drawing the mounting sections including placing a shaft through the holes and the passage with flanges at either end to engage the mounting sections about the holes, at least one of the flanges being forcefully movable along the shaft and forcefully moving the at least one flange along the shaft.

* * * * *